United States Patent
Stanich et al.

(10) Patent No.: US 11,521,031 B2
(45) Date of Patent: Dec. 6, 2022

(54) DIRECT DEPOSIT INK ESTIMATION MECHANISM

(71) Applicants: Mikel Stanich, Longmont, CO (US); Nikita Gurudath, Boulder, CO (US)

(72) Inventors: Mikel Stanich, Longmont, CO (US); Nikita Gurudath, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 17/217,367

(22) Filed: Mar. 30, 2021

(65) Prior Publication Data

US 2021/0271943 A1  Sep. 2, 2021

Related U.S. Application Data

(63) Continuation of application No. 16/804,727, filed on Feb. 28, 2020, now Pat. No. 10,990,863.

(51) Int. Cl.
*G06K 15/00* (2006.01)
*G06K 15/02* (2006.01)
(Continued)

(52) U.S. Cl.
CPC ....... *G06K 15/407* (2013.01); *G03G 15/0856* (2013.01); *G06K 15/027* (2013.01); *G06K 15/4075* (2013.01); *H04N 1/00034* (2013.01); *H04N 1/00068* (2013.01); *H04N 1/60* (2013.01); *H04N 1/2346* (2013.01)

(58) Field of Classification Search
None
See application file for complete search history.

(56) References Cited

U.S. PATENT DOCUMENTS

| 7,423,778 B2 | 9/2008 | Hersch et al. |
| 8,100,057 B2 | 1/2012 | Hartmann et al. |

(Continued)

FOREIGN PATENT DOCUMENTS

| EP | 0454448 | 10/1991 |
| EP | 2313272 B1 | 2/2010 |

(Continued)

OTHER PUBLICATIONS

Rius, M., Casaldàliga, M., Vargas, X. F., Quintero, X., Segura, R., & del Vallès, S. C. (2015, January). Printer Calibrations for HP Large Format Page Wide Technology. In NIP & Digital Fabrication Conference (vol. 2015, No. 1, pp. 326-331). Society for Imaging Science and Technology.

(Continued)

*Primary Examiner* — Miya J Williams
(74) *Attorney, Agent, or Firm* — Jaffery Watson Mendonsa & Hamilton LLP (57) ABSTRACT

A system is disclosed. The system at least one physical memory device to store ink estimation logic and one or more processors coupled with the at least one physical memory device, to execute the ink estimation logic to receive a histogram for each of a plurality of color planes, receive uncalibrated ink deposition data for a printing system, perform a direct conversion of the uncalibrated ink deposition data to generate first calibrated ink deposition data and generate estimated ink usage data for each of the plurality of color planes based on the histograms and the first calibrated ink deposition data.

20 Claims, 10 Drawing Sheets

(51) Int. Cl.
*H04N 1/00* (2006.01)
*G03G 15/08* (2006.01)
*H04N 1/60* (2006.01)
*H04N 1/23* (2006.01)

(56) References Cited

U.S. PATENT DOCUMENTS

| | | | |
|---|---|---|---|
| 8,576,450 | B2 | 11/2013 | Shepherd et al. |
| 8,705,121 | B2 * | 4/2014 | Hattenberger ....... H04N 1/6036 |
| | | | 358/1.9 |
| 8,734,034 | B2 | 5/2014 | Morovic et al. |
| 8,923,713 | B2 | 12/2014 | Terao et al. |
| 9,056,485 | B2 | 6/2015 | Szafraniec |
| 9,096,056 | B2 | 8/2015 | Zhou et al. |
| 9,102,157 | B2 | 8/2015 | Prothon et al. |
| 9,132,629 | B2 | 9/2015 | Ward et al. |
| 9,656,463 | B1 | 5/2017 | Ernst et al. |
| 9,785,873 | B2 | 10/2017 | Stanich et al. |
| 10,129,436 | B2 | 11/2018 | Kimura |
| 10,214,038 | B2 | 2/2019 | Klinger et al. |
| 10,237,452 | B2 | 3/2019 | Rius Rossell et al. |
| 10,338,496 | B2 | 7/2019 | Able et al. |
| 10,902,304 | B1 * | 1/2021 | Stanich ................ G06K 15/027 |
| 11,283,936 | B1 * | 3/2022 | Stanich ................ H04N 1/2392 |
| 2003/0179410 | A1 | 9/2003 | Velde |
| 2012/0050755 | A1 * | 3/2012 | Chandu ................ H04N 1/6033 |
| | | | 358/1.9 |
| 2013/0101328 | A1 | 4/2013 | Morovic et al. |
| 2014/0210898 | A1 * | 7/2014 | Mantell ................ B41J 2/17566 |
| | | | 347/19 |
| 2017/0080732 | A1 * | 3/2017 | Kasahara ................ B41J 2/0456 |
| 2017/0259560 | A1 | 9/2017 | Sreenivasan et al. |
| 2018/0234582 | A1 | 8/2018 | Stanich et al. |
| 2019/0268482 | A1 | 8/2019 | Stanich et al. |
| 2019/0270304 | A1 | 9/2019 | Stanich et al. |

FOREIGN PATENT DOCUMENTS

| | | |
|---|---|---|
| EP | 3531267 A1 | 8/2019 |
| EP | 3534600 A1 | 9/2019 |
| JP | 2018174143 | 11/2018 |
| JP | 2019142223 A | 8/2019 |
| JP | 2019151103 A | 9/2019 |
| WO | 2018022077 A1 | 2/2018 |

OTHER PUBLICATIONS

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alaman, J. et al. (Nov. 2016). Inkjet Printing of Functional Materials for Optical and Photonic Applications. Materials 2016, 9(910). doi:10.3390/ma9110910. See highlighted and underlined sections.

Extended European Search Report for EP21156845.6, dated Jul. 1, 2021, 7 pages.

Japanese office action for JP 2021-030466, dated Jan. 18, 2022, 5 pages (no translation available).

* cited by examiner

DIRECT DEPOSIT INK ESTIMATION MECHANISM

CROSS-REFERENCE

This application is a continuation of U.S. application Ser. No. 16/804,727, filed Feb. 28, 2020, the entire contents of which are hereby incorporated herein by reference.

FIELD OF THE INVENTION

The invention relates to the field of printing systems, and in particular, to performing ink usage estimation for a printing system.

BACKGROUND

In commercial and transactional printers, it is common to estimate ink usage to determine one of the major components of the cost to print a job. Conventional ink estimation methods involve having to first perform a rasterization (or RIP) of the print job to produce a contone image, which is subsequently halftoned with the same halftone producing algorithms and settings to be employed by the targeted printer. The result is a bitmap from the halftoning operation that describes the resulting drop size for each pel. The bitmap encodes the different drop sizes using a unique symbol for each different drop size (e.g., level zero for no drop, one for small, two for medium and three for large).

In an actual printer this bitmap data would be the input to the drivers of ink jet printheads. Hence the data used in an actual printer is the same as the data used to estimate a print job. Since the drop sizes for an ink jet are known, the amount of ink required to print the job for each color may be calculated as the sum of ink for each drop size, page and color.

However, the above-described ink estimation process is computationally intensive. Accordingly, an improved mechanism to perform ink estimation is desired.

SUMMARY

In one embodiment, a method is disclosed. The method includes receiving a histogram for each of a plurality of color planes, receiving uncalibrated ink deposition data for a printing system, performing a direct conversion of the uncalibrated ink deposition data to generate first calibrated ink deposition data by applying a first transfer function to the digital count inputs of the uncalibrated ink deposition data and generating estimated ink usage data for each of the plurality of color planes based on the histograms and the first calibrated ink deposition data.

BRIEF DESCRIPTION OF THE DRAWINGS

A better understanding of the present invention can be obtained from the following detailed description in conjunction with the following drawings, in which.

DETAILED DESCRIPTION

A mechanism to perform ink estimation for a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
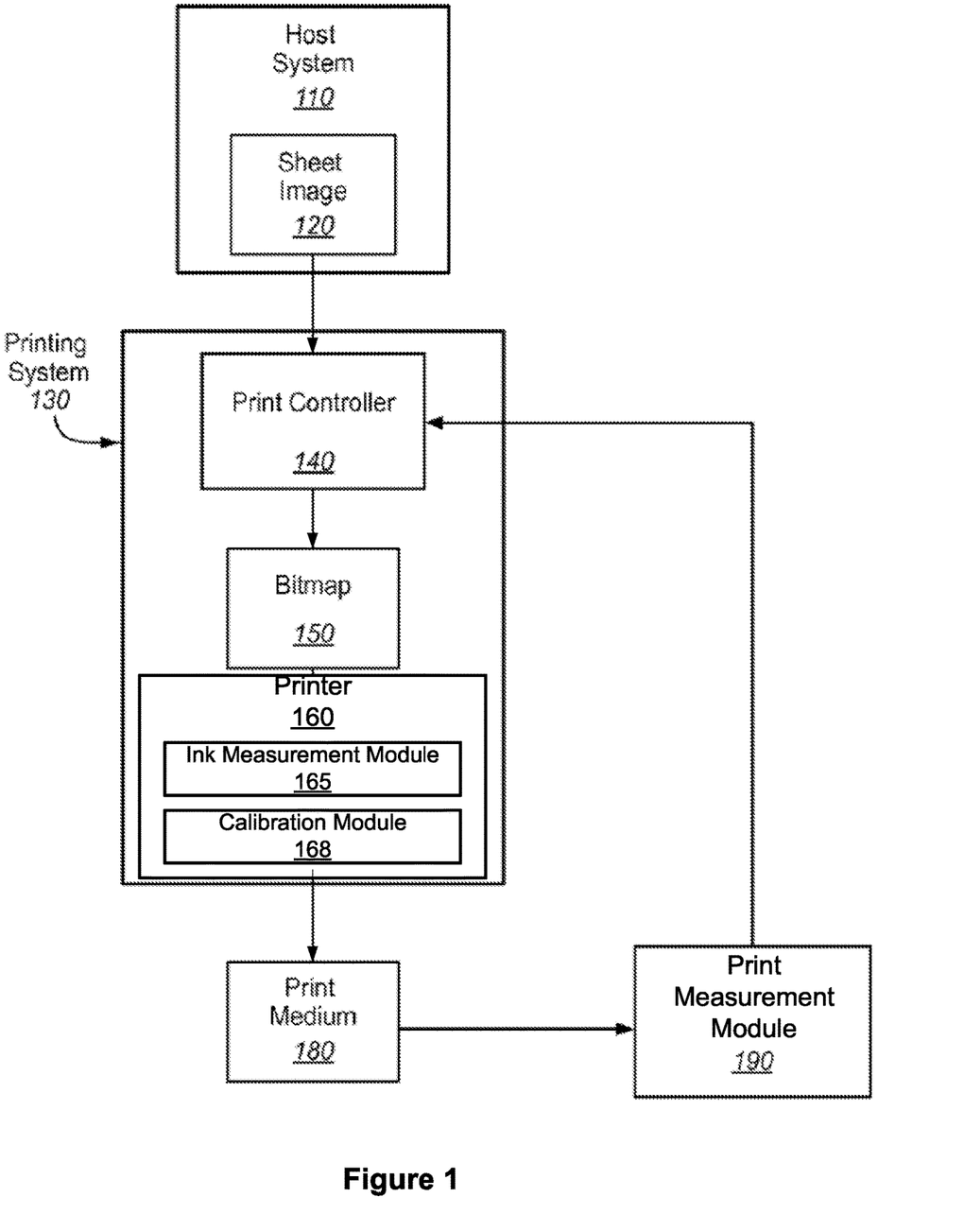
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, textile, plastic and/or any medium suitable for printing) via a printer 160. The resulting print medium 180 may be printed in color and/or in any of number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. Print controller 140 and printer 160 may both be implemented in the same device or in separate devices with coupling.

Print measurement module 190 may be any system, device, software, circuitry and/or other suitable component operable to measure and process the spectral information of ink printed on medium 180 on a per color basis (e.g., print measurement data). In one embodiment, print measurement module 190 is implemented as a spectrophotometer to obtain print measurement data such as optical densities (OD) of the images of the test print job printed on medium 180. Print measurement module 190 communicates the print measurement data with print controller 140 to be used in processes such as determining an ink deposition curve.

An additional application of print measurement module 190 is to measure the printed output of the printer for the purpose of establishing a calibration, which when applied to the processing of the print data achieves a specific desired (e.g., target) calibrated OD. The print measurement module 190 may be a stand-alone process or be integrated into the printing system 130.

According to one embodiment, printer 160 includes an ink measurement module 165. Ink measurement module 165 may be any system, device, software, circuitry and/or other suitable component operable to measure and process ink usage by printer 160 on a per color basis (e.g., ink measurement data). In one embodiment, ink measurement data includes the total quantity (volume or mass) of ink for each primary color used to print a specific job or number of pages.

Ink measurement module 165 communicates the ink measurement data with print controller 140 to be used in processes such as determining ink deposition data (e.g., ink deposition curve). As will be discussed in more detail below, ink deposition is defined as an average amount of ink deposited per printed device pel, where a pel is a picture element of the printer 160 (e.g., the printing device). The amount of ink deposition changes as a function of digital count, where digital count is the gray level representing the pels in the bitmap 150, which ranges from 0-255 for a typical 8 bit system. Additionally, the digital count is a control parameter of the output pel. The amount of ink in ink deposition may be represented by standardized measurement units of mass or volume (e.g., milligrams or milliliters).

In one embodiment, an ink deposition curve is the ink deposition defined over the range of all possible gray levels (e.g., 0-255). In such an embodiment, ink deposition is computed on an average basis to eliminate local variations, due to halftoning, using a set of discrete drop sizes. The ink measurement module 165 may include any combination of pumps, flow meters, weighing devices, ink drop counters, ink drop size data and associated processing suitable to generate ink measurement data. Ink measurement module 165 may be a stand-alone process or be integrated into the printer 160.

Figure 2A:
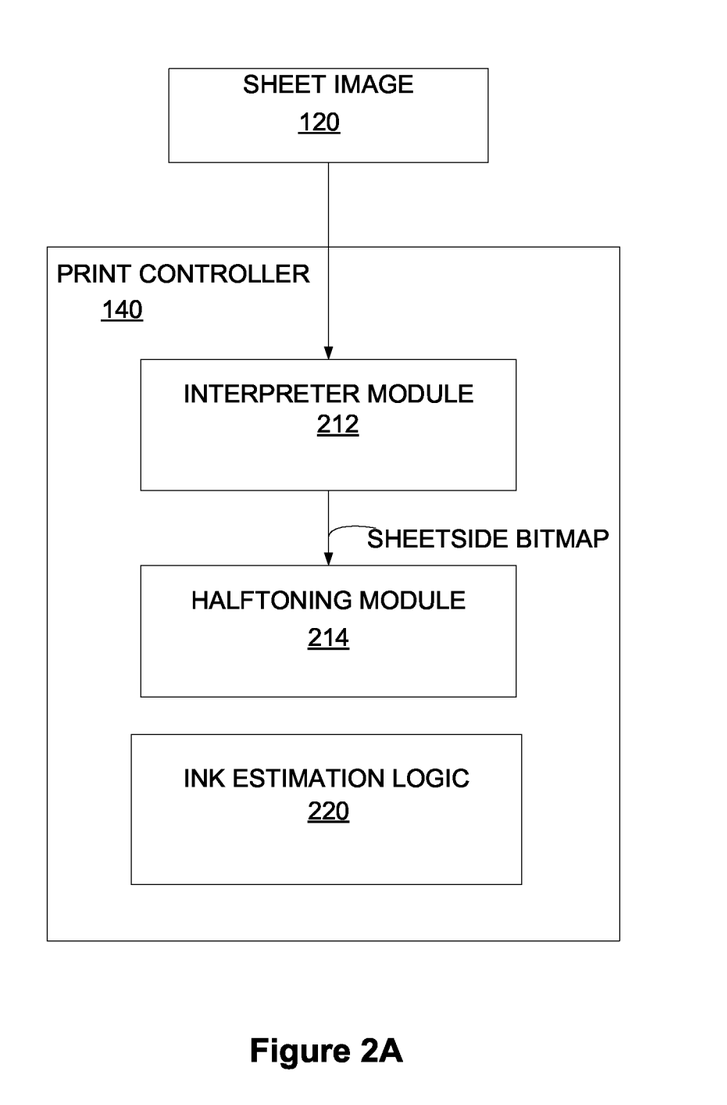
FIGS. 2A&2B are block diagrams illustrating embodiment of a print controller.
Figure 2B:
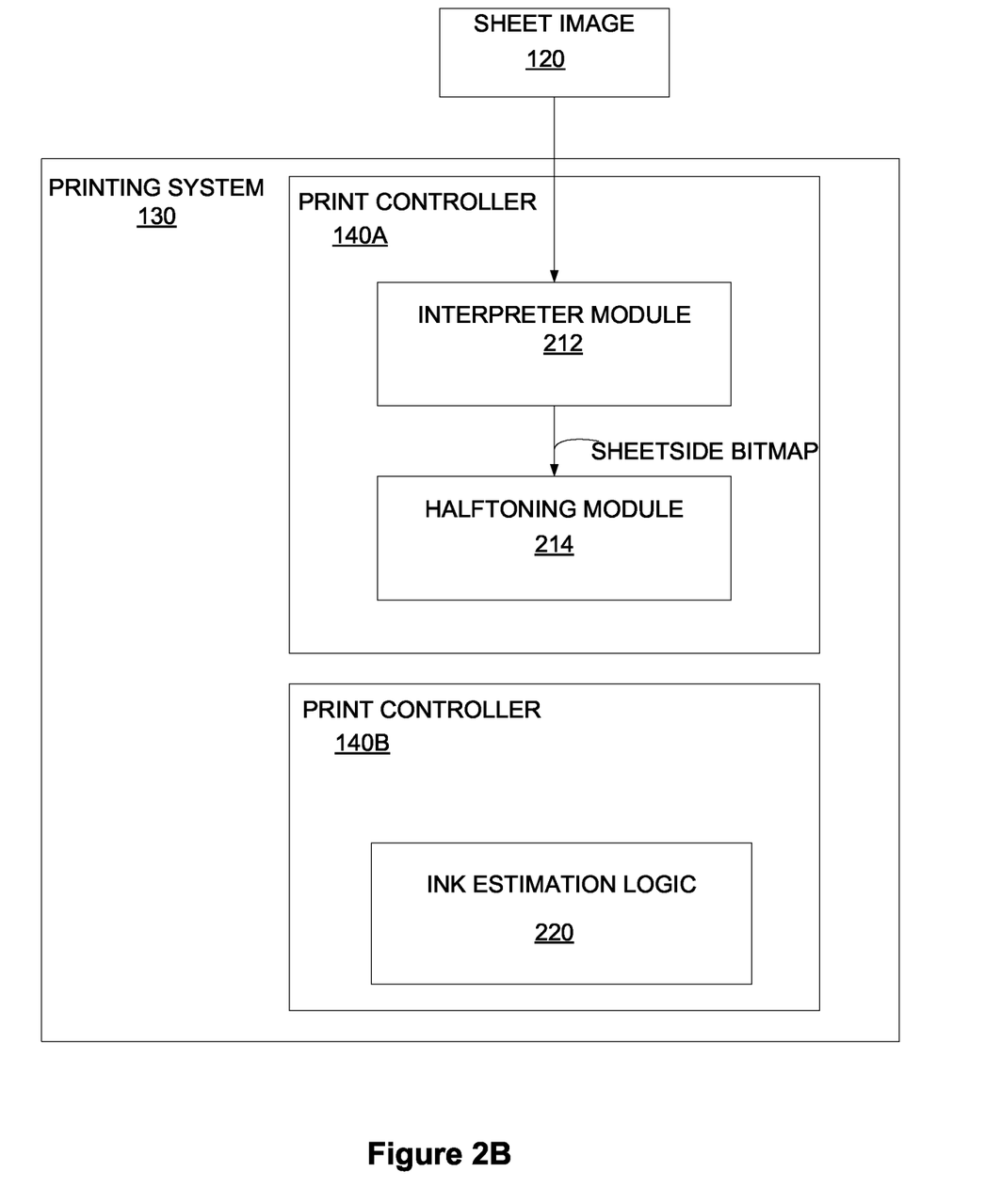

FIGS. 2A&2B illustrate embodiments implementing print controllers 140. FIG. 2A illustrates a print controller 140 (e.g., DFE or digital front end), in its generalized form, including interpreter module 212, halftoning module 214 and ink estimation logic 220, while FIG. 2B illustrates an embodiment having print controllers 140A&140B. In this embodiment, print controller 140A includes interpreter module 212 and halftoning module 214, and print controller 140B includes ink estimation logic 220. Print controllers 140A and 140B may be implemented in the same printing system 130 as shown or may be implemented separately.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image.

Interpreter module 212 is operable to interpret or render multiple raw sheetsides concurrently so that the rate of rendering substantially matches the rate of imaging of production print engines. In one embodiment, the rate of rendering does not apply to stand alone ink estimation components since it is not actually driving a printer. In such an embodiment, the only requirement is producing an estimate in a reasonable amount of time. Halftoning module 214 is operable to represent the sheetside bitmaps as halftone patterns of ink. For example, halftoning module 214 may convert the pels to halftone patterns of CMYK ink for application to the paper.

In addition, measurements of the rasterized (e.g., RIP) data from the print controller 140 are used to generate histograms of the sheetside bitmap data for each color plane. In this case, a histogram indicates how many total pels occur in a set of sheetside bitmaps for each input digital count (or gray level). The set of sheetside bitmaps define a specific print job or number of pages. Ink measurement data corresponds to the same set of sheetside bitmaps or number of pages. The histogram data and ink measurement data are generated as matched sets, each corresponding to the same print data. The histogram data may have total pel counts for a range of gray levels instead of having pel count data for individual gray levels. For example, in such an implementation the histogram would include the total number of pels for each gray level range (e.g., 0-4, 5-9, etc.).

Ink estimation logic 220 is implemented to provide an estimation of ink that is to be used to produce a print job. In such an embodiment, ink estimation logic 220 uses histograms generated for each color plane (e.g., CMYK), as well as a calibrated ink deposition data, to estimate the print job ink usage. Although shown as being implemented in print controller 140, other embodiments may feature ink estimation logic 220 being implemented in any type of computing devices, such as host system 110.

Figure 3:
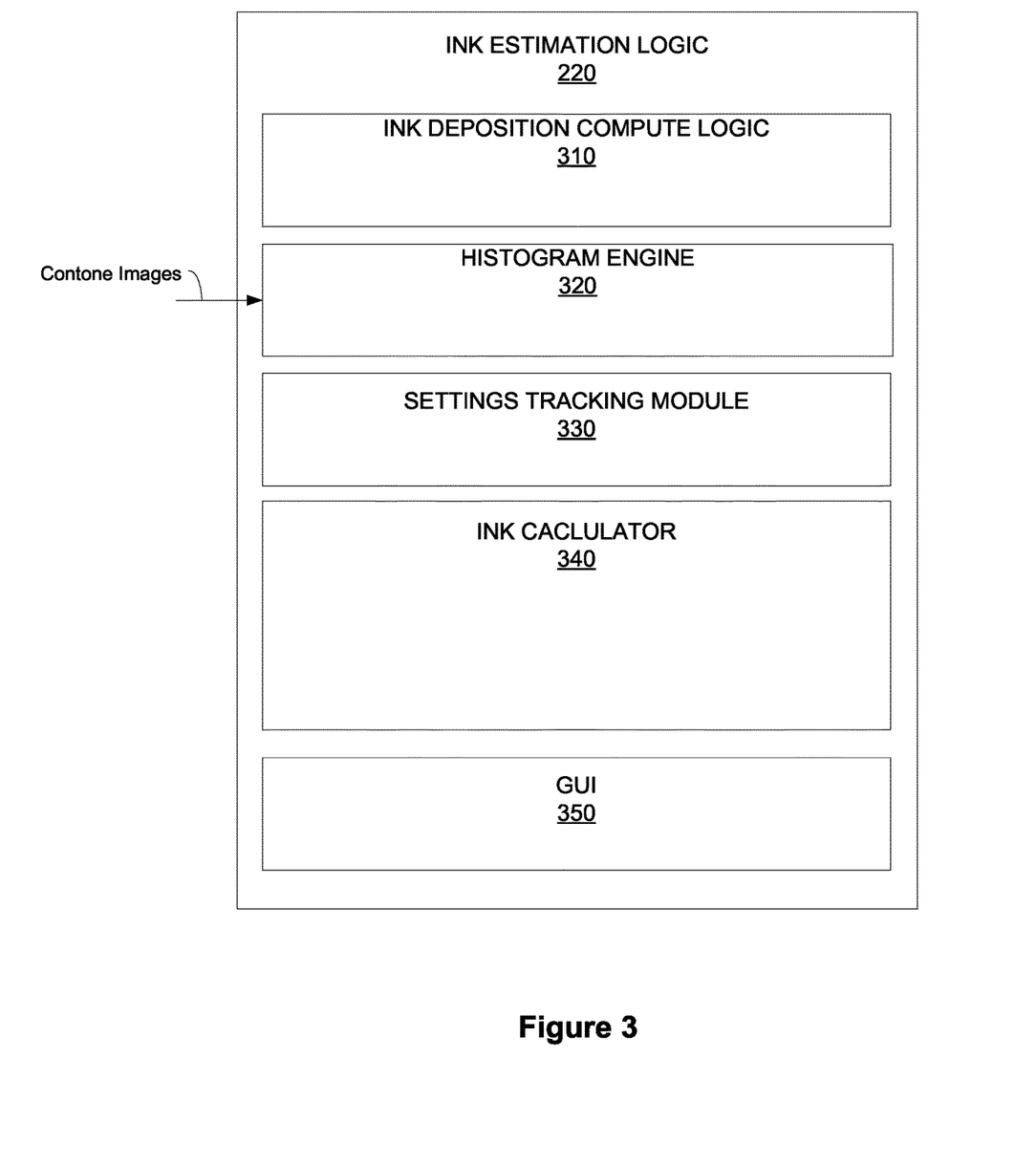
FIG. 3 illustrates one embodiment of ink estimation logic.

FIG. 3 illustrates one embodiment of an ink estimation logic 220, including ink deposition compute logic 310, histogram engine 320, settings tracking module 330 and ink calculator 340. Ink deposition compute logic 310 is implemented to compute calibrated ink deposition data to generate ink estimations.

Figure 4A:
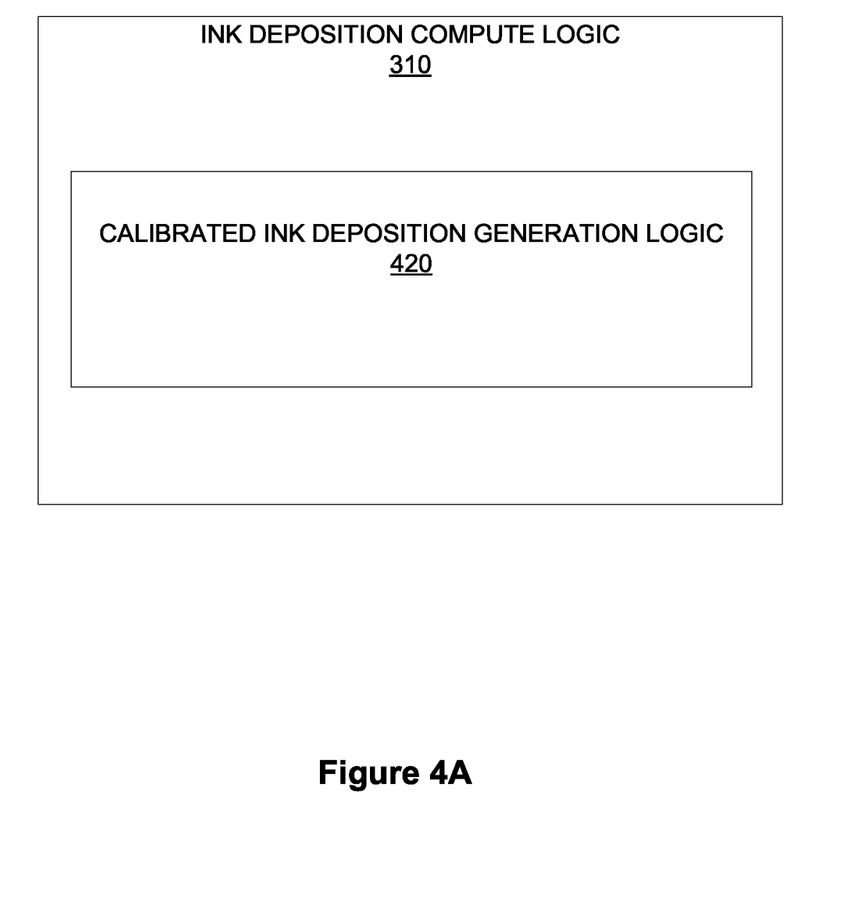
FIG. 4A illustrates one embodiment of ink deposition curve compute logic.

FIG. 4A illustrates one embodiment of ink deposition compute logic 310 including calibrated ink deposition generation logic 420. According to one embodiment, calibrated ink deposition generation logic 420 computes calibrated ink deposition data based on received preliminary uncalibrated ink deposition data. Ink deposition data may be represented as one or more data curves and/or tables. Multiple sets of ink deposition data may be used to generate ink estimates for different cases, such as varying the target optical density of the print job.

In a further embodiment, the calibrated ink deposition data is generated using a direct deposit process. In such an embodiment, the direct deposit process provides a direct conversion of uncalibrated ink deposition data to calibrated ink deposition data using a print engine calibrated transfer function (which may be referred to as transfer function). The transfer function comprises a mapping of an input digital count to an output digital count for the system. Transfer functions may be received or generated (e.g., generated based on target OD versus input digital count data and measured OD versus output digital count data). The uncalibrated ink deposition data represents a mapping of the input digital count to an amount of ink deposition. Thus, the direct deposit process uses a print engine calibration transfer function to transform preliminary uncalibrated ink deposition data into calibrated ink deposition data (e.g., ink deposition tables) via the input digital count of the uncalibrated ink deposition data.

The calibrated ink deposition represents an amount of ink deposition the printer employs when printing to achieve a calibrated target OD response. The uncalibrated ink deposition is the amount of ink deposition the printer employs when printing takes place without achieving a calibrated target OD response. According to one embodiment, no information regarding the target OD response is required in the direct deposit process.

In yet a further embodiment, the uncalibrated print engine response (e.g., OD expressed as a function of digital count) may be converted into a calibrated print engine response by transforming the uncalibrated print engine response with the transfer function (TF). For example, given OD (DC) as representing an uncalibrated optical density (OD) of the printer vs digital count, DC'=TF(DC) defines a transformation of digital count levels using a print engine calibration transfer function (TF) to produce modified levels (DC'), where TF is computed to transform the OD into a calibrated printer response OD'.

Based on the above, OD'(DC)=OD(TF(DC)), where OD' is the calibrated target response of the printer. In a further embodiment, a printer functional relationship (e.g., XX(DC), where DC is the uncalibrated printer values) may be transformed into a calibrated printer relationship (XX') by using the transfer function. Thus, ID'(DC)=ID(TF(DC)) provides an updated (or current) calibrated ink deposition data (ID') derived from the DC of the uncalibrated ink deposition ID and the printer transfer function. According to one embodiment, the print engine calibration transfer function TF is used to make the transformation from uncalibrated to calibrated.

Figure 5:
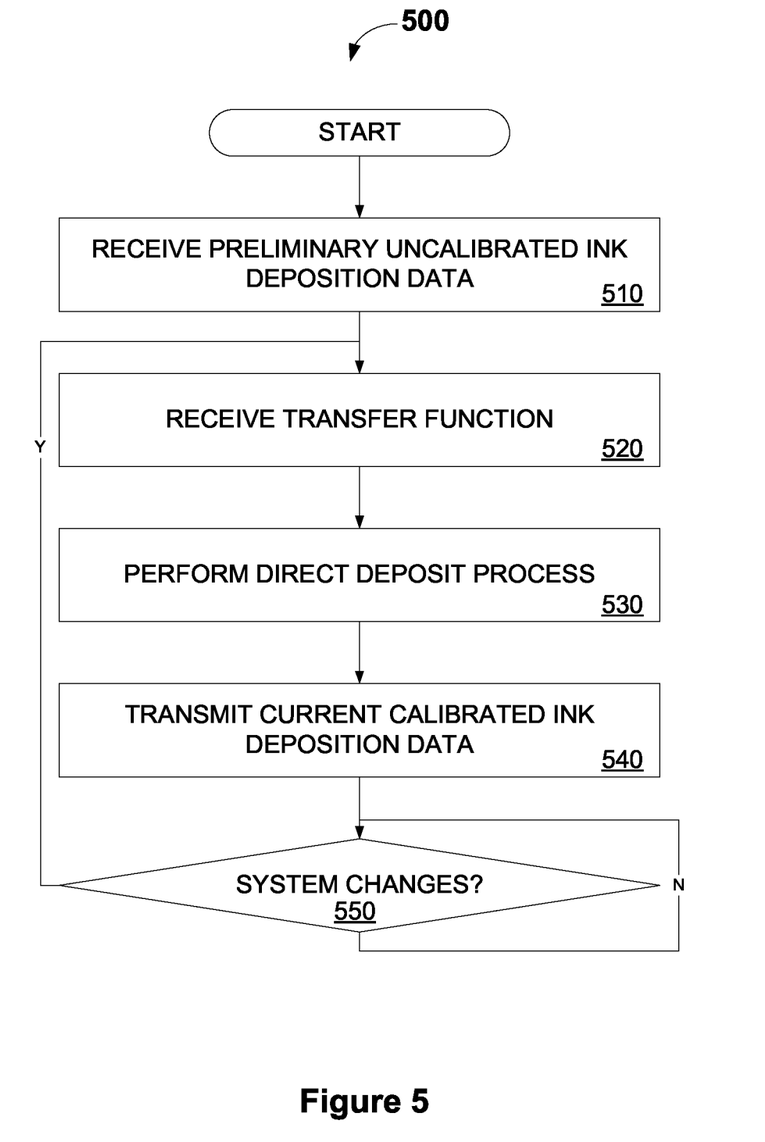
FIG. 5 is a flow diagram illustrating one embodiment of a direct deposit process.

FIG. 5 is a flow diagram illustrating one embodiment of a direct deposit process 500. Process 500 may be performed by processing logic that may comprise hardware (e.g., circuitry, dedicated logic, programmable logic, etc.), software (such as instructions run on a processing device), or a combination thereof. In one embodiment, process 500 may be performed by calibrated ink deposition compute logic 310. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where preliminary uncalibrated ink deposition data is received. In one embodiment, the uncalibrated ink deposition data is received from a storage device, such as memory. In another embodiment, the preliminary uncalibrated ink deposition data may be generated by iteratively (e.g., through regression) measuring actual ink usage (e.g., ink measurement data) for a print interval, performing an ink estimate for the print interval based on an estimated uncalibrated ink deposition curve, comparing the actual ink usage to the ink estimate and revising the estimated ink deposition data until the ink estimate matches the actual ink usage within an acceptable error threshold.

In such an embodiment, the digital count of the estimated uncalibrated ink deposition data and engine calibration transfer function are used to determine a calibrated ink deposition. The calibrated ink deposition is used to estimate ink usage for a test print job. Afterwards the test print job (e.g., the print interval) is printed and corresponding ink measurement data is generated at measurement module 190. The ink measurement data is subsequently compared to the estimated ink usage to determine whether the respective values are equivalent. If equivalent (or substantially equivalent), the estimated uncalibrated ink deposition value is used as the preliminary uncalibrated ink deposition data. Otherwise the process is repeated with revised estimated uncalibrated ink deposition data. The initial estimated uncalibrated ink deposition curve may be guessed or determined through various methods (e.g., based on halftone design and drop sizes and/or an ink model and OD response, etc.). In yet another embodiment, the preliminary uncalibrated ink deposition data may be generated using an inverse of the direct deposit process, as will be discussed in detail below.

At processing block 520, the print engine calibrated transfer function is received. At processing block 530, the direct deposit process is performed by applying the transfer function to the preliminary uncalibrated ink deposition digital count data to generate the current calibrated ink deposition data. At processing block 540, the current calibrated ink deposition data is transmitted. In one embodiment, the data is transmitted to memory for storage. However, the current calibrated ink deposition data may be transmitted directly to ink calculator 340 for ink estimation.

At decision block 550, a determination is made as to whether one or more printer system 130 changes have been detected that effect the printer transfer function. The printer transfer function achieves specific target response ODs for a given print medium 180 type (e.g., paper type). Upon a determination that the target OD changes (e.g., to achieve a lighter or darker printing, or if the paper changes) a new transfer function may be received or generated.

Changes to the printer resolution may also require changing the printer transfer function, since this involves changing the applied halftone design. Printer system changes may further occur due to inherent instability of the print engine due to continuous operation or external environmental effects like environment humidity, temperature, etc. Further, printer system changes may occur due to deviations of the printer operation as certain factory or field print quality adjustments deteriorate with time or usage such as printhead voltage adjustment drift, engine calibration drift, uniformity drift, etc.

Upon a determination at decision block 550 that a printer system 130 change has occurred that effects the printer transfer function, control is returned to processing block 520 where an updated transfer function that corresponds to the change is received. Thus, printer system 130 characteristic changes that effect the transfer function comprise target OD, print medium 180, print resolution, environmental parameters, print quality adjustments, halftone design and/or etc. Upon a determination at decision block 550 that a printer system 130 change has not occurred that effects the printer transfer function, control may remain at decision block 550.

Transfer functions may be saved and reused. If an engine transfer function has been performed using a specific paper type and target OD, it generally does not need to be determined again. It can be saved and reused by the printer, for example in the cases where the same paper and target OD are used again. Similarly, for ink estimation, estimates can be obtained using saved transfer functions that have been previously determined for the print system 130 condition (e.g., for the desired paper and target OD).

Figure 4B:
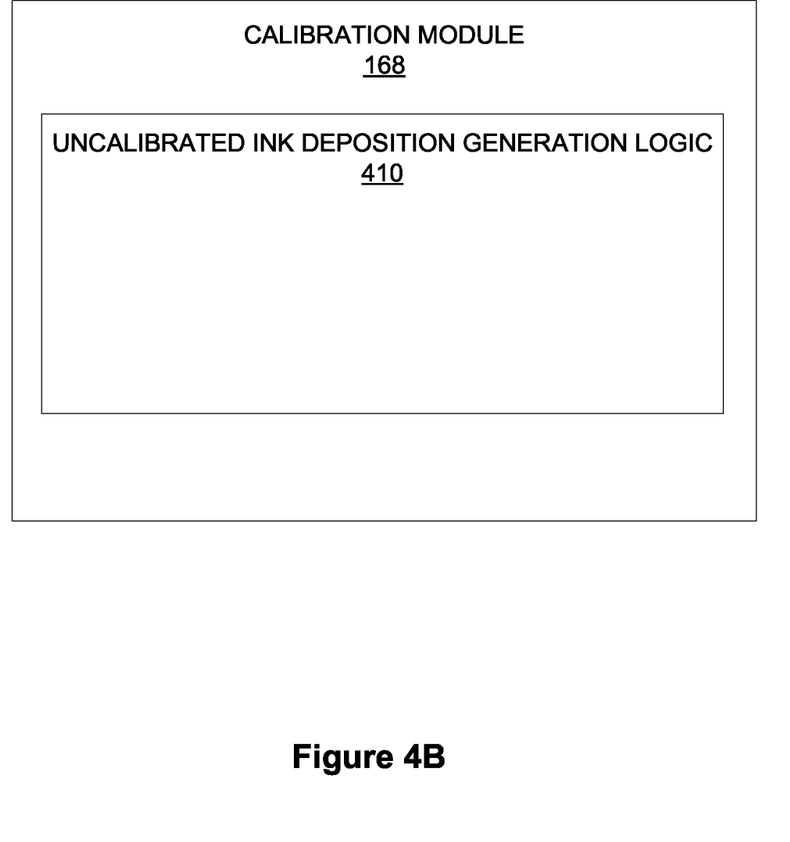
FIG. 4B illustrates one embodiment of a calibration module.

As discussed above, the preliminary uncalibrated ink deposition data may be generated using an inverse of the direct deposit process. In such an embodiment, the preliminary uncalibrated ink deposition data is generated at a calibration module 168 within printer 160 (FIG. 1). FIG. 4B illustrates one embodiment of calibration module 168 including uncalibrated ink deposition generation logic 410 to generate the preliminary uncalibrated ink deposition data.

While the transfer function may change frequently, the uncalibrated ink deposition curve remains relatively constant for practical purposes. Therefore, uncalibrated ink deposition curve may be used repeatedly with different transfer functions to derive new calibrated ink deposition curves. Hence the printer system can constantly change as different transfer functions are employed and the calibrated ink deposition corresponding to those changes will be reflected in the ink estimates generated using the corresponding transfer functions.

In one embodiment, different uncalibrated ink deposition curves are implemented for different halftone designs. Since the exact halftone patterns vary (e.g., to cover different resolutions, paper types and print speeds) determination of multiple uncalibrated ink deposition curves may be required. In a further embodiment, the uncalibrated ink deposition curve is selected based on the printer settings, which describe these variables. Typically only a small set of uncalibrated ink deposition curves is needed, since the same halftones are usually employed for different speeds and paper types.

In one embodiment, uncalibrated ink deposition generation logic 410 receives preliminary calibrated ink deposition data that is used to generate the preliminary uncalibrated ink deposition data. In such an embodiment, the preliminary calibrated ink deposition data is determined based on ink measurement data (e.g., volume or mass) from ink measurement module 165 (FIG. 1) for each primary color ink (e.g., CMYK, MICR, coatings or other marking materials) used for printing at printer 160 and histogram data (e.g., generated at histogram engine 320).

In a further embodiment, the ink measurement data corresponds to the data in the histogram in that they both represent data for printed pages of a test print job. The ink measurement data and histogram data may be either associated with the same test print job or cover the same printing in a given time period. In yet a further embodiment, uncalibrated ink deposition generation logic 410 also receives ink measurement data indicating an ink supply quantity used to complete the printing of a test print job at printer 160 on a per color basis.

In yet a further embodiment, the uncalibrated ink deposition curves may be derived based on the multibit threshold array and the specific ink drop sizes (e.g., amounts of ink per drop size) used. This process determines the average ink deposited over the area defined by the threshold array for each gray level of the halftone design. The average uncalibrated deposition is converted to average ink amount per histogram pel, for the purposes of determining the ink estimates. The halftone design employed for this analysis is the same uncalibrated halftone design used by the printer. Uncalibrated ink deposition curves may be computed for each different halftone design the printer uses. A halftone design comprises a set of thresholds which define the output levels for a collection of pels corresponding to input image levels. The set of thresholds for a halftone design is defined to be a threshold array (TA). A multibit threshold array contains thresholds for each of a plurality of ink drop sizes.

Ink deposition curves are selected, for the purpose of ink estimation, to match the halftones used by the printer during printing. The drop sizes used in this analysis are selected to accurately match the drop sizes used for printing. Drop sizes (e.g., amounts of ink per drop size) may be determined by analyzing the volume of ink used for printing, from ink measurement module 165, combined with the number of drops of each size used during printing over the same printing analysis interval (e.g., period of time, print job, print pages, etc.). The analysis may be done with regression analysis, the use of a printer ink model and/or other methods.

In one embodiment, the test print job is used to facilitate an ink measurement process that measures the ink supply usage quantity (volume or mass) for each primary ink color used to print the test print job. A test print job having image content that prints for the entire tone range, aids the accuracy of the determined ink deposition curve. In a further embodiment, a number of prints to be printed in the test print job are determined so that an estimated ink volume (or mass) to be used in printing the test print job is significantly greater than a magnitude of errors associated with an ink volume (or mass) measurement process performed at ink measurement module 165. Subsequently, the estimated number of prints is printed at printer 160 using the printer settings and printer operating environment. Once printing of the test job is commenced, printer 160 may be operated to print continuously with minimized downtime in order to maximize accuracy of the ink measurement process.

In other embodiments, the process can also be operated in a real-time manner to monitor the operation of the printer. In such a system, generation of the ink deposition data is made on a continuous basis. To begin this process, an printer ink model and ink deposition curve may be determined immediately following the calibration of the printer system 130. Once the ink model and ink deposition data are accurately established for the calibrated system, the print system 130 is monitored and ink deposition curves are generated based on the continuous reporting of data (e.g., ink measurement data) from the printer combined with continuous generation of histogram data.

In a further embodiment, histogram engine 320 generates a histogram (e.g., a distribution of a number of pels for every gray level) for each color plane implemented to print the test print job. In such an embodiment, a histogram is generated by receiving contone images corresponding to each color plane of the test print job and performing a count of the total number of pels having the same digital count value for all pels from the set of images, over a total range of allowable digital count values (e.g., 0-255). For a contone image, the total number of grey levels per color plane=$2^n$, where n=bit depth. Accordingly, four histograms are generated to define all possible colors for a print job in the CMYK color space and still other planes (e.g., MICR or Protector Coat) may also have histograms generated.

In one embodiment, the preliminary calibrated ink deposition data is computed based on the histogram and the ink measurement data. In this embodiment, the preliminary calibrated ink deposition data is computed by using an ink model that represents an OD versus deposition (e.g., ink amount coverage per unit area) relationship for the print system 130.

Referring back to FIG. 4B, uncalibrated ink deposition generation logic 410 generates the preliminary uncalibrated ink deposition data by applying an inverse application of the above-described direct deposit process. In such an embodiment, an inverse transfer function (ITF) is applied to the preliminary calibrated ink deposition data to directly compute the uncalibrated ink deposition data. Thus, the inverse application of the direct deposit process uses the ITF of the printer calibration data to transform preliminary calibrated ink deposition data into the preliminary uncalibrated ink deposition data, which may be saved as a fundamental ink deposition. The forward application of the transfer function converts input digital count values to calibrated output digital count values. The inverse transfer function is the reversed application of the digital count data, where the output calibrated digital count values of the transfer function form the input digital count values of the inverse transfer function and the input digital count values of the transfer function form the output digital count values of the inverse transfer function.

Figure 6:
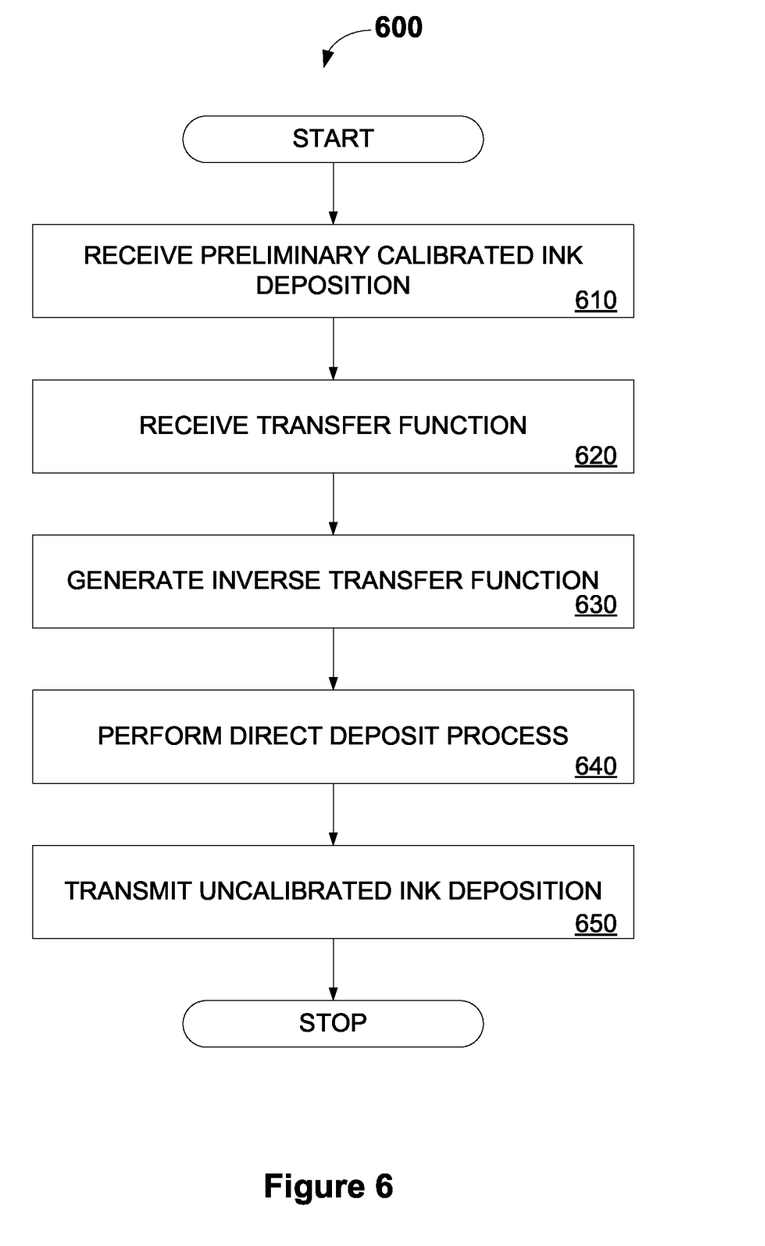
FIG. 6 is a flow diagram illustrating one embodiment for generating an uncalibrated ink deposition curve.

FIG. 6 is a flow diagram illustrating one embodiment of a process 600 for generating an uncalibrated ink deposition curve. Process 600 may be performed by processing logic that may comprise hardware (e.g., circuitry, dedicated logic, programmable logic, etc.), software (such as instructions run on a processing device), or a combination thereof. In one embodiment, process 600 may be performed by uncalibrated ink deposition generation logic 410. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where preliminary calibrated ink deposition data is received. At processing block 620, the printer calibrated transfer function is received. At processing block 630, the inverse transfer function is generated. At processing block 640, the direct deposit process is performed by applying the inverse transfer function to the preliminary calibrated ink deposition data to generate the preliminary uncalibrated ink deposition data. At processing block 650, the current uncalibrated ink deposition data is transmitted. In one embodiment, the data is transmitted to memory for storage. However, the preliminary uncalibrated ink deposition data may be transmitted directly to calibrated ink deposition generation logic 420 for generation of the current calibrated ink deposition data.

Referring back to FIG. 3, histogram engine 320 generates histograms for each color plane of a received print job, as mentioned above, based on received contone images corresponding to each color plane of the print job and a digital count value for each pel over a total range of allowable digital count values. This results in four histograms that define all possible colors for a print job in the CMYK color space.

Settings tracking module 330 acquires and stores print job settings and printer system settings that are used in conjunction with the histograms to perform ink estimation. In one embodiment, the print job settings and printer system settings are received via a GUI 350 included for ink estimation logic 220. However other embodiments may comprise settings tracking module 330 receiving the print job settings information via a job ticket submitted with the print job and/or components of print controller 140.

In one embodiment, print job settings include information, such as scaling, n-up or other imposition, print quality/resolution, number copies, simplex/duplex. In a further embodiment, one or more of these print job settings may be included in a print job settings group (e.g., a job ticket). Moreover, many of the print job settings may already be accounted for in sheetmaps, such as imposition, resolution and number of copies. Printer system settings may include information for printer 160, such as the current calibrated ink deposition curve, print resolution, flushing type, post-processing marks, undercoat/overcoat type, ink selection, density mode, print speed or the printer type/model.

One or more of the printer system settings may also be included in a printer system settings group (e.g., a printer snapshot or printer profile). An ink deposition curve or table is represents an amount of ink in a pel (or per area) deposited for different gray levels; where more ink is provided as the gray level increases and no ink is applied for white. Ink deposition curves may be specific to printer system settings such as print engine type and ink type. Ink deposition curves may also be automatically selected based on the printer system settings. Ink deposition data may be a vector which in this case is a set of values, forming a sequence of numbers of a Look Up Table.

Ink calculator 340 computes an estimated ink usage based on the color histogram, print job settings and/or print system settings. According to one embodiment, ink calculator 340 computes a total volume of ink as a dot product of the histogram and the current calibrated ink deposition data generated from the direct deposit process. In the dot product case, the histogram and ink deposition data are ordered by their respective digital count values such that the product occurs between respective values having the same digital counts. In such an embodiment, the total volume of ink is computed on a per pel and per color plane basis, such that for each color plane:

$$Volume_{estimate} = \sum_{i=0}^{2^{bitDepth}-1} Histogram_i \cdot InkDeposition_i$$

$$= \overrightarrow{Histogram} \circ \overrightarrow{InkDeposition}$$

In another embodiment, ink calculator 340 may adjust ink usage for each color plane based on print job settings. For example, an estimated ink usage for a single copy of a print job may be adjusted to account for multiple copies of the job by multiplying the estimated ink usage of the print job by the number of copies of the print job. Furthermore, since there are no restrictions on the histogram data, ink estimates can be determined at a page basis using histogram data for a single page instead of the histogram data for a job. In this case, ink usage estimates can be provided for a job at a page level and also at the job level by summing the page level estimates.

Thus, ink calculator 340 computes estimated ink usage for each color plane for a print job. This volume estimate determines ink that is related to the histogram generated from the contone image data. This may not account for all the sources of ink usage, such as when the printer engine adds flushing patterns or ejects ink for maintenance purposes. To account for additional ink usage that is not accounted for by the histogram, the initial estimated volume is adjusted to obtain a new estimated volume based on printer system settings (e.g., flushing type, post-processing marks, or printhead maintenance type) or print job settings that cause ink usage not accounted for in the histograms. This may take the form of the ink estimation logic 220 calculating additional volumes of ink per linear displacement of the web or per page based on the print job and the corresponding printer system settings or print job settings.

Likewise, ink calculator 340 may estimate other ink usage quantities from a dot product with the histograms. Most notably, page coverage data (the average amount of the page covered by ink) can be estimated from this method. Here, there are various options available, including: 1) a measure of all non-zero pels, or 2) a weighted measure of the pels based on their relative darkness.

Figure 7:
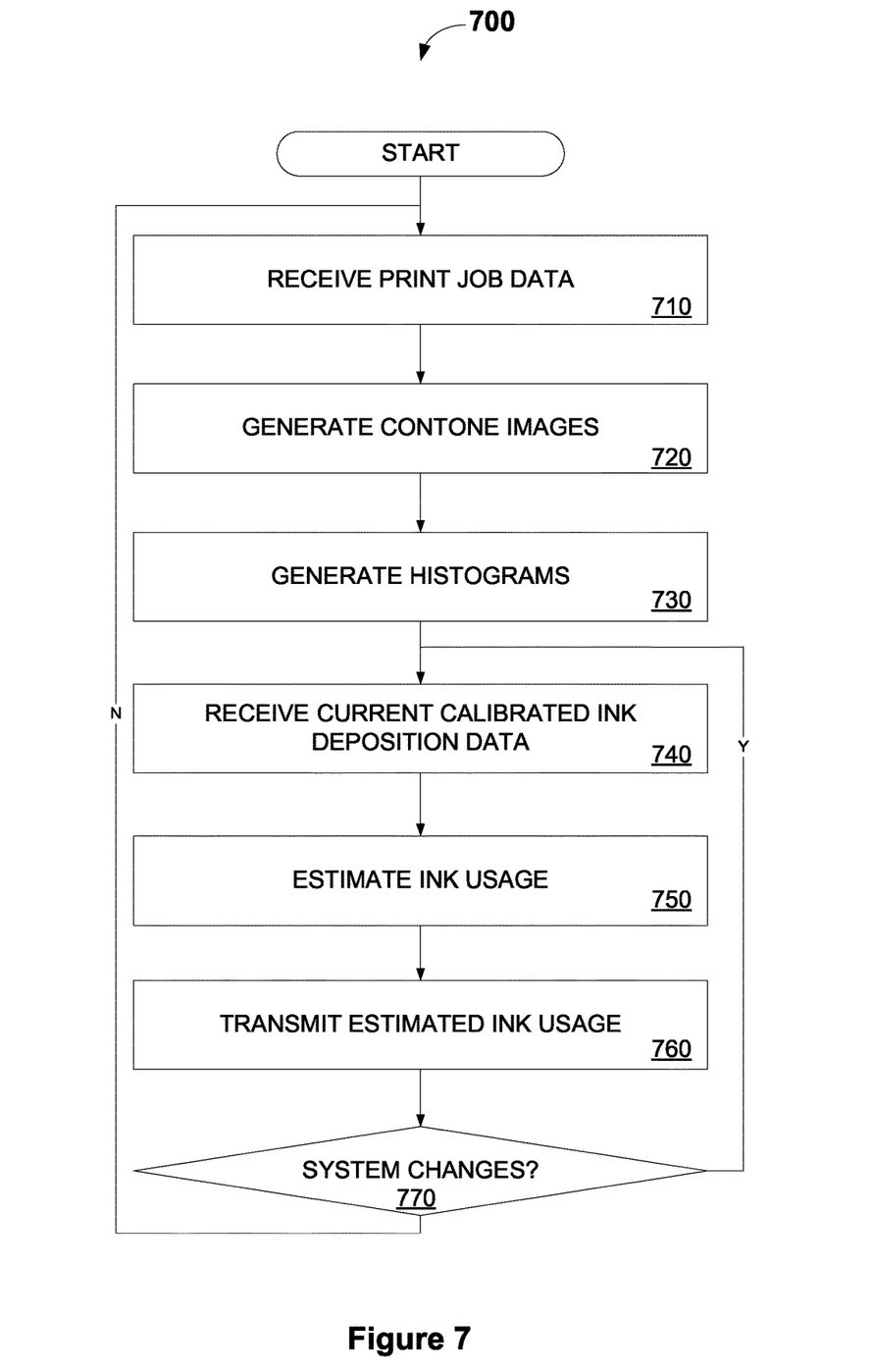
FIG. 7 is a flow diagram illustrating one embodiment for performing an ink estimation process.

FIG. 7 is a flow diagram illustrating one embodiment of a process 700 for performing ink estimation. Process 700 may be performed by processing logic that may comprise hardware (e.g., circuitry, dedicated logic, programmable logic, etc.), software (such as instructions run on a processing device), or a combination thereof. In one embodiment, process 700 may be performed by ink estimation logic 220. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 710, where print job data is received. In one embodiment, a job ticket (e.g., Job Definition Format (JDF)) is also received with the print job data. At processing block 720, contone images are received or generated based on the print job, and job ticket if included. At processing block 730, histograms are received or generated for each color plane based on the contone images. At processing block 740, the current calibrated ink deposition data is received.

At processing block 750, the estimated volume of ink usage is computed based on the histograms and the current calibrated ink deposition data. At processing block 760, the estimated ink usage data is transmitted (e.g., reported). In one embodiment, estimated ink usage is displayed via GUI 350. However, in other embodiments, print controller 140 may transmit estimated ink usage data to an external computing device.

At decision block 770, a determination is made as to whether one or more print system 130 changes have been detected that effect the printer transfer function. If not, control is returned to processing block 710, where another print job is received. However, upon detection of such a print system 130 change, control is returned for execution of processing block 740, where updated current calibrated ink deposition data is received. In such an embodiment, the updated current calibrated ink deposition data is generated by a subsequent implementation of the direct deposit process to apply a transfer function associated with the system change to the preliminary uncalibrated ink deposition data.

Figure 8:
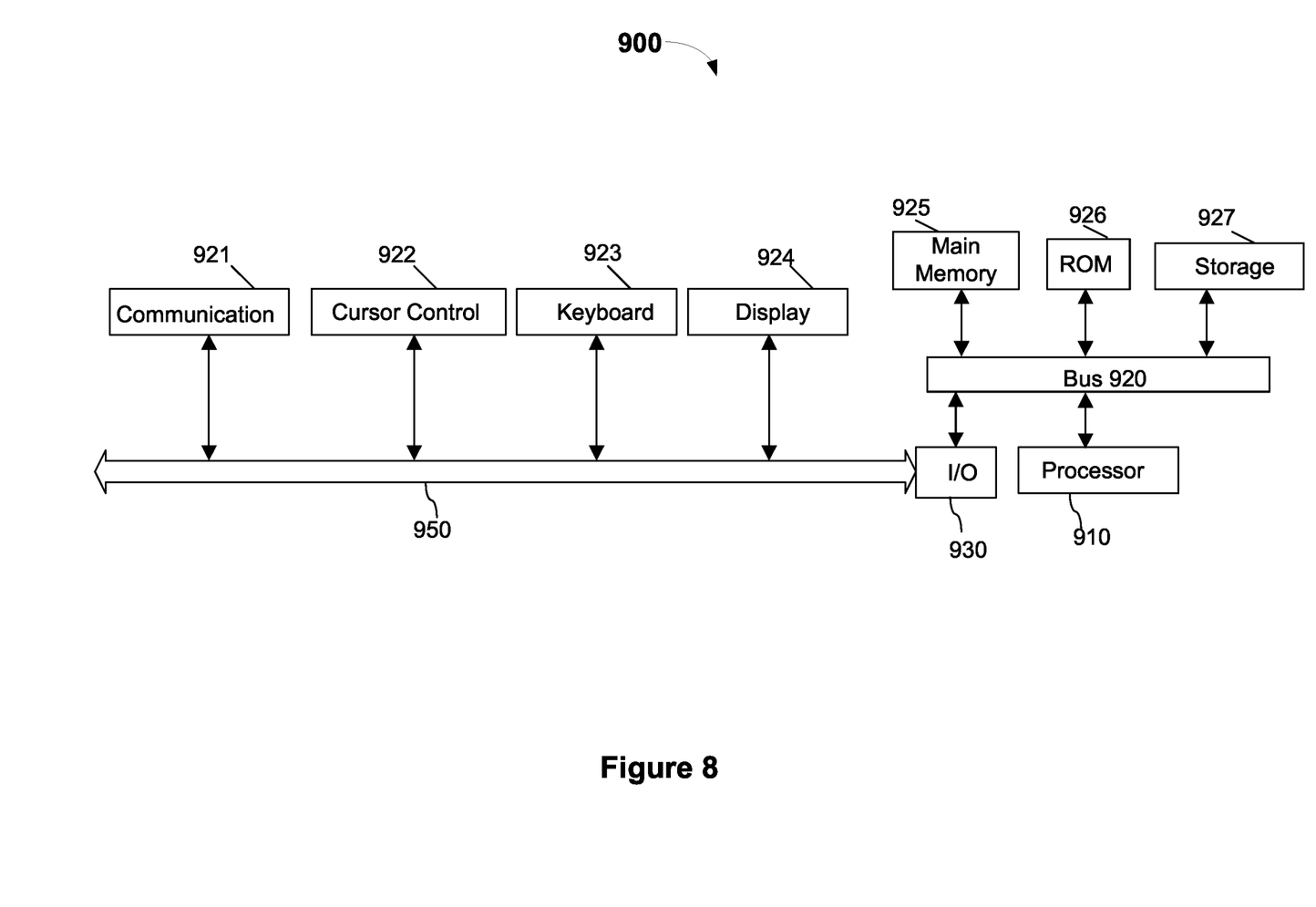
FIG. 8 illustrates one embodiment of a computer system.

FIG. 8 illustrates a computer system 900 on which printing host 110, printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard 923 (e.g., alphanumeric input device) and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:
1. A system comprising:
   at least one physical memory device to store ink logic; and
   one or more processors coupled with the at least one physical memory device, to execute the ink estimation logic to:
      receive uncalibrated ink deposition data for a printing system; and
      perform a direct conversion of the uncalibrated ink deposition data to generate first calibrated ink deposition data, wherein ink deposition comprises an ink amount deposited per unit area.
2. The system of claim 1, wherein the ink deposition data further comprises an ink deposition curve that represents a mapping of the input digital count to the ink amount deposited per unit area.

3. The system of claim 1, wherein the ink deposition data further comprises an ink deposition table that represents a mapping of the input digital count to the ink amount deposited per unit area.

4. The system of claim 1, wherein performing the direct conversion comprises applying a first transfer function to the uncalibrated ink deposition data.

5. The system of claim 4, wherein the ink logic transmits the calibrated ink deposition data.

6. The system of claim 1, wherein the ink logic further to generate ink usage data for each of a plurality of color planes based on histograms and the first calibrated ink deposition data.

7. The system of claim 1, wherein the ink estimation logic receives the first transfer function.

8. The system of claim 7, wherein the first transfer function comprises a mapping of input digital count to output digital count of the printing system, wherein the uncalibrated ink deposition data is a mapping of the input digital count to an amount of ink deposition.

9. The system of claim 1, wherein the ink estimation logic further to:
   detect one or more changes to the printer system;
   receive second transfer function data associated with the changes to the printer system; and
   perform a second direct conversion of the uncalibrated ink deposition data using the second transfer function to generate second calibrated ink deposition data.

10. The system of claim 9, wherein the ink estimation logic further to generate second estimated ink usage data for each of the plurality of color planes based on the histograms and the second calibrated ink deposition data.

11. At least one non-transitory computer readable medium having instructions stored thereon, which when executed by one or more processors, cause the processors to:
    receive uncalibrated ink deposition data for a printing system; and
    perform a direct conversion of the uncalibrated ink deposition data to generate first calibrated ink deposition data, wherein ink deposition comprises an ink amount deposited per unit area.

12. The computer readable medium of claim 11, having instructions stored thereon, which when executed by the one or more processors, further cause the processors to receive the first transfer function.

13. The computer readable medium of claim 12, having instructions stored thereon, which when executed by the one or more processors, further cause the processors to transmit the estimated ink usage data.

14. The computer readable medium of claim 11, having instructions stored thereon, which when executed by the one or more processors, further cause the processors to display the estimated ink usage data at a graphical user interface.

15. The computer readable medium of claim 11, having instructions stored thereon, which when executed by the one or more processors, further cause the processors to:
    detect one or more changes to the printer system;
    receive second transfer function data associated with the changes to the printer system; and
    perform a second direct conversion of the uncalibrated ink deposition data using the second transfer function to generate second calibrated ink deposition data.

16. The computer readable medium of claim 15, having instructions stored thereon, which when executed by the one or more processors, further cause the processors to generate second estimated ink usage data for each of the plurality of color planes based on the second calibrated ink deposition data.

17. A method comprising
    receiving uncalibrated ink deposition data for a printing system; and
    performing a direct conversion of the uncalibrated ink deposition data to generate first calibrated ink deposition data, wherein ink deposition comprises an ink amount deposited per unit area.

18. The method of claim 17, further comprising receiving the first transfer function.

19. The method of claim 17, further comprising transmitting the estimated ink usage data.

20. The method of claim 17, further comprising:
    detecting one or more changes to the printer system;
    receiving second transfer function data associated with the changes to the printer system; and
    performing a second direct conversion of the uncalibrated ink deposition data using the second transfer function to generate second calibrated ink deposition data; and
    generating second estimated ink usage data for each of the plurality of color planes based on the second calibrated ink deposition data.

* * * * *